United States Patent [19]
Carter, Sr.

[11] 3,738,211
[45] June 12, 1973

[54] ADJUSTABLE SAW GUIDE
[76] Inventor: Arthur D. Carter, Sr., 207 Castle Ridge, Austin, Tex. 78746
[22] Filed: Oct. 4, 1971
[21] Appl. No.: 186,099

[52] U.S. Cl. .................................. 83/522, 269/289
[51] Int. Cl. .................................................... B27b
[58] Field of Search .............. 143/6 G, 6 R, 47 F; 83/522; 264/289-306

[56] References Cited
UNITED STATES PATENTS
| | | | |
|---|---|---|---|
| 2,627,287 | 2/1953 | McCluskey | 143/6 G |
| 3,327,744 | 6/1967 | Urholt | 143/6 G |
| 2,818,892 | 1/1958 | Price | 143/6 G |
| 2,926,706 | 3/1960 | Hopla | 143/6 G |
| 2,959,199 | 11/1960 | Naumann | 143/6 G |

Primary Examiner—Donald R. Schran
Attorney—John C. Stahl

[57] ABSTRACT

An adjustable saw guide comprising a movable arm selectively secured at a predetermined angle for guiding a hand operated power saw, means for elevating said arm to accommodate a board of any desired thickness, means for securing said arm away from the working area when not in use, and means for positioning said arm preparatory to securing the same.

5 Claims, 7 Drawing Figures

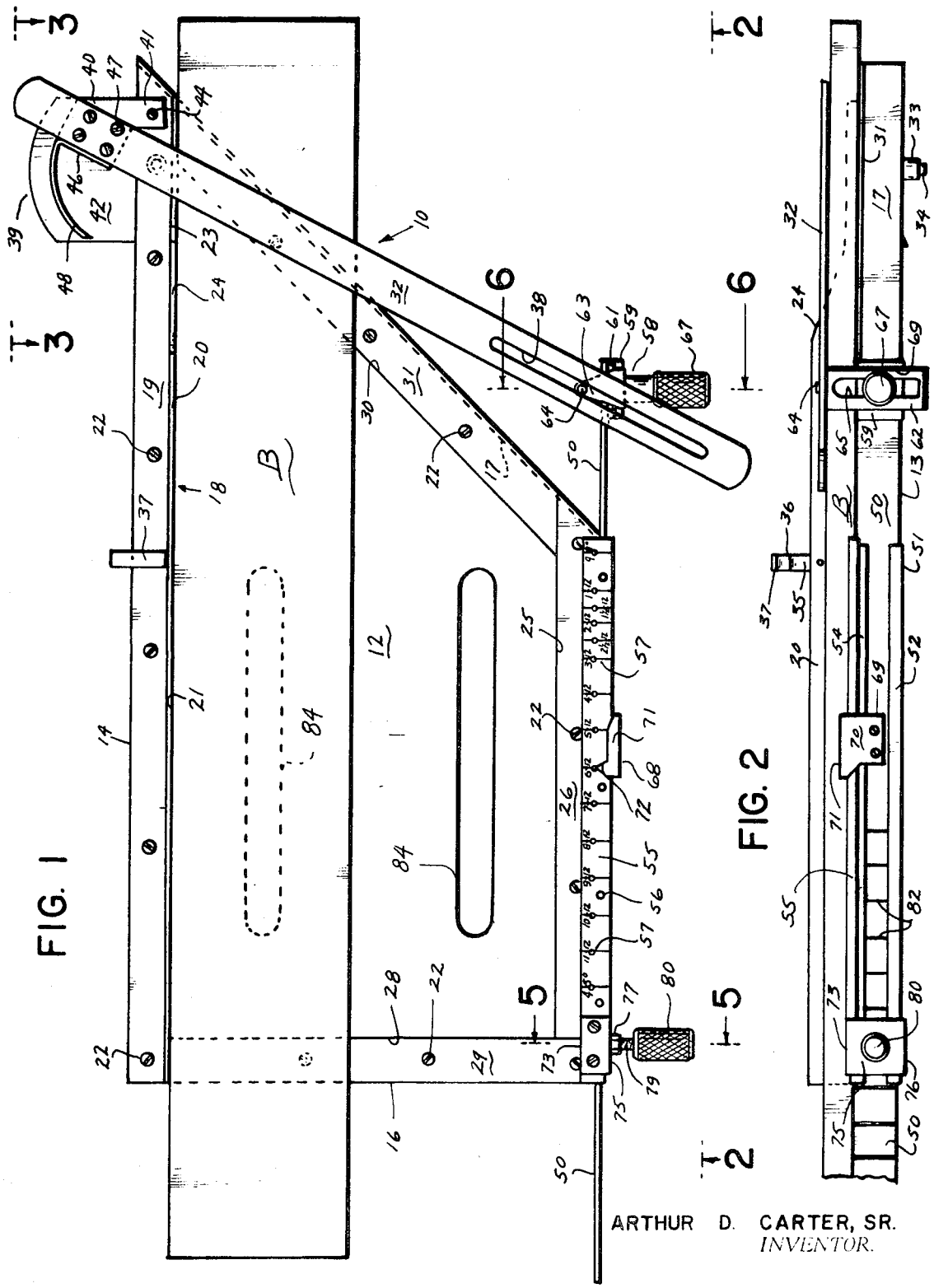

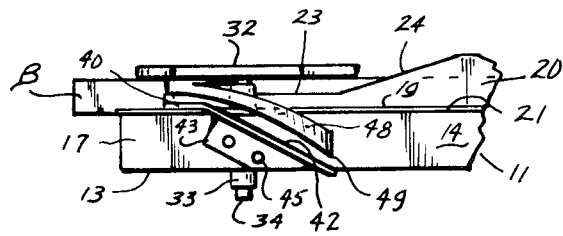
FIG. 3
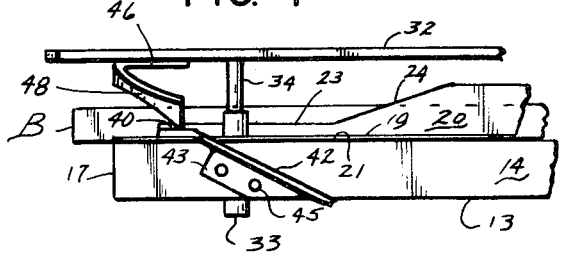
FIG. 4
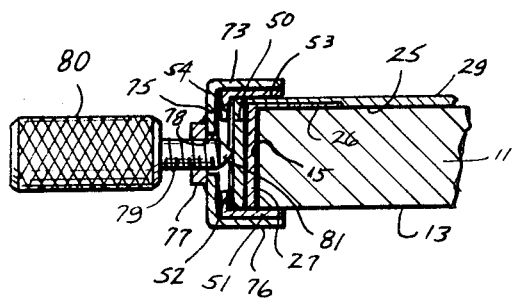
FIG. 5
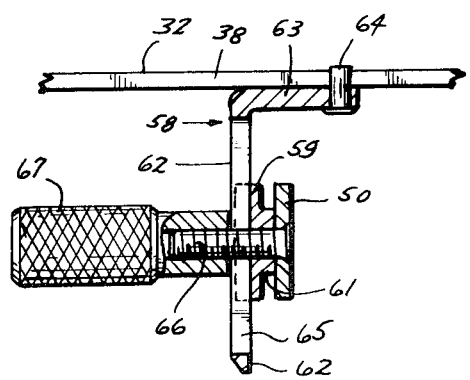
FIG. 6
FIG. 7
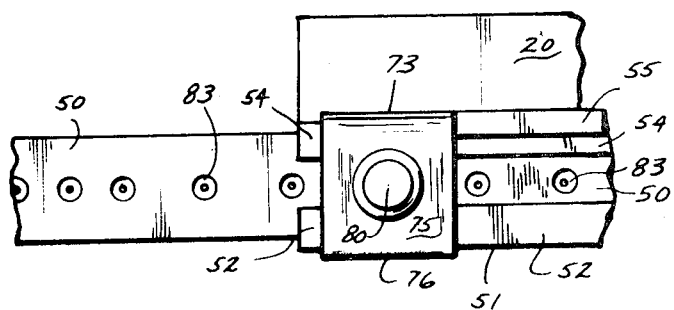
ARTHUR D. CARTER, SR.
INVENTOR.
BY John C. Stahl
ATTORNEY

ADJUSTABLE SAW GUIDE

BACKGROUND OF THE INVENTION

Heretofore, relatively skilled craftsmen were required to lay out and measure rafters and other building members which had to be cut at a specific angle. A radial saw requiring two hundred twenty volt, three phase alternating current was often utilized by said craftsmen at a fabrication plant after which the finished rafters and other members were transported to the building site. The adjustable saw guide of the subject invention permits those engaged in the building trades to cut material at an exact, predetermined angle or pitch, using a hand operated power saw. More specifically, an unskilled worker may rapidly and accurately cut one or more rafters simultaneously, at the building site, with a minimum of effort.

SUMMARY OF THE INVENTION

It is therefore an object of the present invention to provide a guide to enable successive pieces of material to be cut by means of a power saw without the necessity of laying out the particular angles.

Another object is to provide an adjustable saw guide which may be set at a desired angle, locked in position, and a power saw utilized by an unskilled worker to cut any desired number of rafters or other building members to exact specifications.

Still another object is to provide a portable saw guide including a movable guide for a hand operated power saw and means to secure said movable guide away from the working area when not in use.

A final object is to provide a light weight, adjustable saw guide which is universal in its adaptability, maintenance free over extended periods of time, and extremely simple to use.

BRIEF DESCRIPTION OF THE DRAWINGS

FIG. 1 is a top plan view of the adjustable saw guide of the subject invention.

FIG. 2 is a side elevation view of FIG. 1.

FIG. 3 is a fragmentary, side elevational view, taken on the line 3—3 of FIG. 1, looking in the direction of the arrows, showing the movable arm abutting the upper surface of a board.

FIG. 4 is a fragmentary, side elevational view, showing the movable arm in elevated and secured condition.

FIG. 5 is an enlarged, vertical sectional view, taken on the line 5—5 of FIG. 1, looking in the direction of the arrows.

FIG. 6 is an enlarged, vertical sectional view, taken on the line 6—6 of FIG. 1, looking in the direction of the arrows.

FIG. 7 is a fragmentary, enlarged, side elevational view, showing another embodiment of securing means utilized in the practice of the invention.

Referring now to the drawings, wherein like reference characters designate like or corresponding parts throughout the several views, there is shown in FIGS. 1 and 2 of the drawings a preferred embodiment of the adjustable saw guide 10 of the subject invention, said saw guide is adapted to be supported above the ground at a convenient working height. Base plate 11 of wood or metallic composition and of any desired length and width is trapezoidal in plan consisting of top 12, bottom 13, parallel sides 14–15, and ends 16–17; end 16 is perpendicular to sides 14,15 whereas end 17 is preferably at a 45° interior angle relative to side 14.

A longitudinally extending guide 18, adjacent side 14, comprises flanges 19–20; longitudinal recess 21 in top 12 terminates laterally in side 14. The edge of flange 19 is vertically aligned with side 14 and screws 22 or other fastening means passed downwardly through bores (not shown) in said flange into base plate 11. Preferably, the foremost end of flange 19 parallels end 17 and terminates slightly forward thereof. Flange 20 terminates forwardly in horizontal flat 23 of reduced height with angularly inclined shoulder 24 rearwardly thereof. As will hereinafter be described, one side of board B is normally butted against vertically extending flange 20.

Longitudinal recess 25 (see FIG. 5), provided in top 12 and terminating laterally in side 15, accommodates flange 26 of a longitudinally extending angle; downwardly depending flange 27 of said angle bears against side 15 and is coextensive in length therewith; countersunk screws 22 or the like are passed through bores in flange 26 into the base plate. The foremost end of flange 26 parallels end 17 and preferably terminates slightly forward thereof.

Transversely extending recess 28 in top 12 terminates rearwardly in end 15 with strap 29 fixedly secured therein by means of countersunk screws 22. In like manner, angularly extending recess 30 in top 12 terminates forwardly in end 17 with strap 31 fixedly secured therein; the foremost side of strap 31 parallels end 17 and extends slightly forward thereof. It is understood that the ends of straps 29 and 31 may either butt flanges 20 and 26, respectively, or a lap joint may be provided between such members, as illustrated in FIG. 5 of the drawings; furthermore, the upper surfaces of flange 26 and straps 29,31 lie in the plane of top 12 of the said base.

As best seen in FIGS. 1, 3 and 4 of the drawings, elongated arm 32 pivotally connects to flange 19 heretofore mentioned. More specifically, vertically extending collar 33 passes through aligned bores (not shown) in proximity to the foremost end of flange 19 and base plate 11, respectively; said collar terminates upwardly of flange 19 and downwardly of bottom 13. Downwardly depending pin 34, adapted to insert in collar 33, is butt welded or otherwise fixedly secured to the lower surface of arm 32 in proximity to one end thereof. Arm 32 is desirably secured at an elevated height and removed from the normal working area permitting placement or removal of a selected board B on base plate 11. One end of vertical support 35 is conventionally secured to the outer surface of flange 20, said support terminates above the edge of flange 20 in a horizontally and laterally extending segment 36 with turned-back segment 37 aligned with and spaced vertically thereabove; segments 36,37 are adapted to frictionally engage the medial portion of arm 32 inserted therein. In secured condition, the innermost edge of arm 32 is approximately vertically aligned with flange 20. Vertically and longitudinally extending slot 38 is provided in proximity to the remote end of arm 32, the purpose of which hereinafter will be described.

It has been found especially advantageous to provide means whereby arm 32 is raised to the proper height preparatory to securing the same as arm 32 is rotated in a clockwise direction. As illustrated in FIG. 1 of the drawings, plate 39 terminates forwardly in transversely extending flat 40 with integrally formed and inwardly extending lug 41 in the same plane; rearwardly, the said plate includes an angularly downwardly extending surface 42 with perpendicularly depending flange 43 along the inner side thereof. Plate 39 is secured to side 14 adjacent collar 33 by means of screw 44 passing downwardly through aligned bores in lug 41, flange 19, and into base plate 11. Screws 45 or the like pass through flange 43 into side 14 of the base plate.

Plate 46 is detachably secured to the undersurface of arm 32 forwardly of pin 34 by machine screws 47 or other fastening means. As viewed in FIGS. 3 and 4 of the drawings, one end of downwardly depending, arcuate member 48 is fixedly secured to plate 46 with the other end 49 of said arcuate member spaced vertically above surface 42 of plate 39 when said arm bears against the top of board B. When arm 32 is rotated in a clockwise direction, end 49 bears against inclined surface 42. As arm 32 is rotated still further, end 49 rides up inclined surface 42 and arm 32 remotely secured thereto is raised; when end 49 rides on flat 40 arm 32 may insert intermediate segments 36,37 securing the same in elevated and retracted condition.

A longitudinally and vertically extending bar 50 of greater length than side 15 reciprocally slides on flange 27. More specifically, flange 51 (see FIG. 5) of a longitudinally extending angle, coextensive in length with side 15, is fixedly secured to bottom 13 and passes downwardly of bar 50 supporting the same; upwardly extending flange 52 of said angle passes laterally of said bar maintaining the same against flange 27. Flange 53 of a coacting, longitudinally extending angle is fixedly secured in a manner hereinafter to be described to flange 26 and is coextensive in length therewith; downwardly depending flange 54 of said angle passes laterally of the upper portions of bar 50 maintaining the same firmly against flange 27.

As viewed in FIGS. 1 and 2 of the drawings, longitudinally extending bar 55 at least partially overlies flange 26 with screws 56 passing downwardly through the said bar, flanges 53 and 26, respectively, into base plate 11. Indicia 57 are provided in the upper surface of bar 55 designating specific angles or rafter cuts as measured between the foremost edge of arm 32 and flange 20.

The remote end of arm 32 coacts with adjustable means 58 (see FIG. 6) on the foremost end of bar 50 permitting vertical adjustment of arm 32 relative to the upper surface of board B. More specifically, means 58 includes plate 59 with a vertically extending groove in the face thereof, said plate terminates rearwardly in a longitudinally extending base 61 of reduced height which is conventionally secured to bar 50 and adapted to pass between the ends of flanges 52 and 54. As illustrated in FIG. 6, vertically and longitudinally extending base 62, adapted to ride in groove 60, terminates upwardly in perpendicularly inwardly extending flange 63, essentially triangular in plan; vertical pin 64 conventionally secured to said flange is adapted to insert in a tight fit in slot 38 in the remote end of arm 32. A transversely and vertically extending slot 65 in base 62 accommodates laterally extending stud 66 secured rearwardly to bar 50. Knurled nut 67, threaded onto stud 66, is adapted to bear against base 62. Flat 23 of reduced height in the foremost end of flange 20 permits the undersurface of arm 32 to be adjusted to bear against the top of a board of minimal thickness.

As viewed in FIGS. 1 and 2 of the drawings, indicating means 68 is fixedly secured to the lateral, approximate medial portion of bar 50. Base 69, adapted to pass between the ends of flanges 52 and 54, terminates upwardly in vertically extending plate 70 which passes laterally of flange 54 and the side of bar 55. Flange 71 extends perpendicularly inward, at least partially overlies bar 55, and terminates rearwardly in pointer 72.

There is shown in FIG. 5 of the drawings one embodiment whereby bar 50 is fixedly secured in a selected position. Flange 73 overlies flange 53 heretofore mentioned and is secured thereto by screws 74 or the like; the foremost end of flange 73 abuts the end of bar 55. Web 75 passes laterally of flanges 52 and 54, respectively, with flange 76 passing downwardly of flange 51 and conventionally secured thereto. Nut 77, fixedly secured to web 75 and aligned with bore 78 therein, accommodates screw 79 which terminates laterally in knurled knob 80 and inwardly in beveled end 81. End 81 is adapted to insert into a selected longitudinally spaced and vertically extending groove 82 in the face of bar 50 corresponding to a selected angle or rafter cut as indicated on bar 55 by pointer 72.

In the embodiment of FIG. 7, beveled end 81 of screw 79 is adapted to insert into a selected, longitudinally spaced, circular recess 83 in the face of bar 50 or a corresponding bore passing through the said bar.

In a further modification of the invention, a plurality of longitudinally and vertically extending, laterally spaced slots 84 pass through base plate 11 whereby sawdust, wood shavings and the like may pass therethrough.

In use, one or more boards B are placed upon base plate 11 with one side butting flange 20; each additional boards butts and adjacent board with the respective ends extending forwardly of end 17. Knurled nut 67 is loosened whereby base 62 is vertically adjusted so that the undersurface of said arm abuts the top surface of the boards carried on the base plate; nut 67 is then tightened. The user may slide bar 50 in either direction to a selected angle, ranging from 45° to 90°, or cut, ranging from 1:12 to 11:12 as indicated on bar 55 by pointer 72. Screw 79 is then rotated to insert into the corresponding groove 82, circular recess 83, or bore in bar 50. The foremost side of arm 32 serves as a guide for the base of a hand operated power saw or the like whereby the blade thereof cuts parallel to and forwardly of end 17. After cutting, arm 32 may be raised at which time pin 64 is removed from slot 38 and the said arm may be rotated in a clockwise direction; arm 32 is simultaneously raised preparatory to securing the same in the manner heretofore described.

It is understood, of course, that the foregoing disclosure relates to only preferred embodiments of the invention and that numerous modifications or alterations may be made therein without departing from the spirit and scope of the invention set forth in the appended claims.

What is claimed is:

1. An adjustable saw guide for use with a hand operated power saw comprising
   a trapezoidally shaped base comprising first and second parallel sides and first and second ends,
   a longitudinally extending board guide adjacent said first side of said base,
   an elongated arm pivotally connected to said base adjacent said first side, said arm extending at least partially across said base, means coacting with said arm for adjusting the vertical height of said arm, means to adjust the angle of said arm relative to said board guide, an inclined surface secured to said base, and a downwardly depending arcuate member secured to said arm and adapted to bear against said inclined surface whereby said arm is raised preparatory to securing the same vertically above said board guide.

2. The invention of claim 1 wherein said movable arm is adjustable at an interior angle ranging from 45° to 90° relative to said longitudinally extending board guide.

3. The invention of claim 1 further including means securing said arm in a selected position.

4. The invention of claim 1 further including means securing said arm vertically above said board guide when said arm is not in use.

5. An adjustable saw guide for use with a hand operated power saw comprising a trapezoidally shaped base comprising first and second parallel sides and first and second ends, a longitudinally extending board guide adjacent said first side of said base, an elongated arm pivotally connected to said base adjacent said first side, said arm extending at least partially across said base, means coacting with said arm for adjusting the vertical height of said arm, means to adjust the interior angle formed between said arm and said longitudinally extending board guide at an angle ranging from 45° to 90°, means to secure said arm in a selected position, means to secure said arm vertically above said board guide when said arm is not in use, an inclined surface secured to said base, and a downwardly depending arcuate member secured to said arm and adapted to bear against said inclined surface whereby said arm is raised preparatory to securing said arm above said board guide.

* * * * *